United States Patent
Huyssen

[15] 3,647,241
[45] Mar. 7, 1972

[54] RIDER-PROPELLED VEHICLE

[72] Inventor: Phillip H. Huyssen, 116 Baber St., Hot Springs, Ark. 71901

[22] Filed: Dec. 23, 1969

[21] Appl. No.: 887,595

[52] U.S. Cl. ............................................. 280/221, 280/229
[51] Int. Cl. ............................................................. B62m 1/04
[58] Field of Search ........................................ 280/221, 229

[56] References Cited

UNITED STATES PATENTS

| 1,364,471 | 1/1921 | Ameli | 280/221 |
| 3,086,795 | 4/1963 | Hatcher et al. | 280/221 |

FOREIGN PATENTS OR APPLICATIONS

| 803,740 | 10/1936 | France | 280/221 |
| 9,295 | 2/1900 | Norway | 280/221 |

*Primary Examiner*—Benjamin Hersh
*Assistant Examiner*—John P. Silverstrim
*Attorney*—Dawson, Tilton, Fallon & Lungmus

[57] ABSTRACT

A rider-propelled vehicle has a footboard on which the rider may shift his weight in the propelling action and is provided at its front with a support and a handle-equipped steering shaft mounted in the support and with a fork receiving a front wheel. The rear portion of the board is slotted longitudinally to receive a rear wheel which is provided with an eccentric bearing. A shaft extending through the bearing is carried by support arms pivotally mounted upon the footboard, and a brace extends about the wheel and moves with the support arms.

3 Claims, 4 Drawing Figures

PATENTED MAR 7 1972

3,647,241

INVENTOR:
PHILLIP H. HUYSSEN
BY
Dawson, Tilton, Fallon & Lungmus
ATT'YS

RIDER-PROPELLED VEHICLE

BACKGROUND AND SUMMARY

Rider-propelled vehicles of the general type herein have been employed in which the slotted rear footboard receives a rear wheel which is mounted upon rigid arms carried by the footboard. The wheel is similar to a bicycle wheel but with the ball bearing fitting supported off center for an inch or so, with the wire spokes of the wheel engaging the flanges of the bearing fitting. The rigid mounting of the support arms carrying the axle, which extends through the bearing, makes the propelling operation a jerky and uneven operation and places considerable stress upon the footboard and the front support mounting and after some use tends to damage these parts.

While heretofore it seemed necessary to employ the rigid support arms for carrying the offcenter-mounted wheel, I have discovered that it is possible to support the wheel with arms which are pivotally supported upon the footboard, and further that this structure overcomes the jerky and irregular operation heretofore experienced and, instead, gives a smooth movement which relieves the stress on the footboard and front support mounting, while in addition a longer distance can be achieved with each revolution of the wheel. Further, with the pivotally mounted support arms, a substantial portion of the working stroke is in a longitudinal plane generally parallel with the footboard so as to achieve a better propelling action with less rise of the footboard.

DRAWING

In the accompanying drawing:

FIG. 1 is a perspective view, taken from the side of the vehicle, illustrating my invention;

FIG. 2, a rear end view showing the eccentric mounting of the axle;

FIG. 3, a broken detail side view of the pivotal support structure;

and FIG. 4, a sectional view, the section being taken as indicated at line 4—4 of FIG. 3.

DETAILED DESCRIPTION

Figure 1:
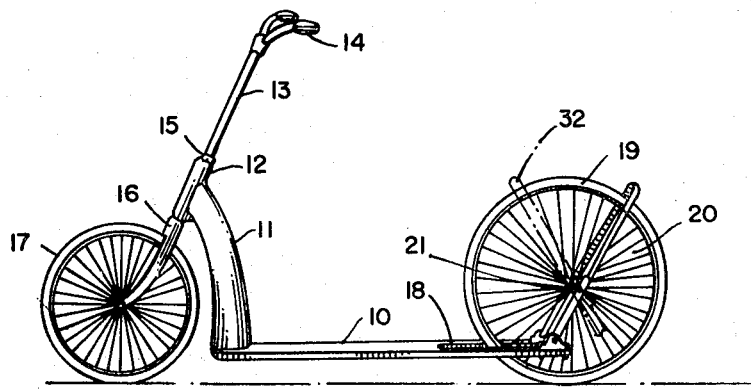

In the illustration given, 10 designates a footboard which may be formed of sturdy wood, such as ash, etc., or if desired of metal or other suitable material. At the forward end of the board 10, there is bolted or otherwise secured to the board a support mounting 11 carrying a cylindrical sleeve 12 in which is mounted a steering shaft 13 carrying handles 14. The shaft may be provided with a collar at 15, and below the sleeve 12 a fork member 16 is secured to the steering shaft 13 and the fork carries an axle for a front wheel 17.

The footboard 10 is provided at its rear with a longitudinal central slot 18 for receiving a rear wheel 19. The wheel 19, in the illustration given, is provided with wire spokes 20 which at their inner ends are secured to flanges of a ball bearing fitting 21, the bearing being located off center to a desired point, such as, for example, 1 to 3 inches and preferably about 2 inches.

Figure 4:
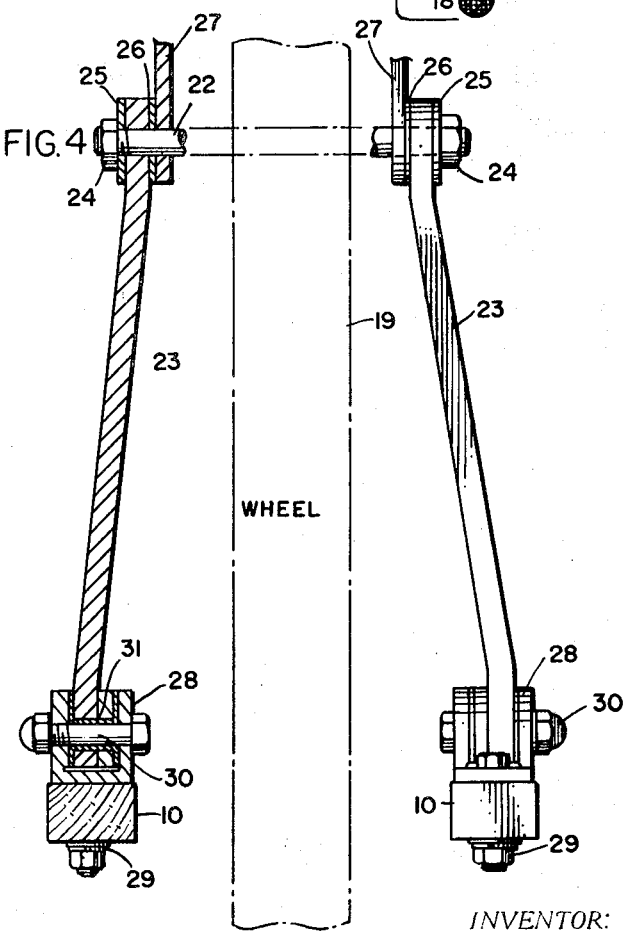

Extending through the ball bearing 21 is an axle shaft 22, the shaft being carried by support arms 23, as shown best in FIG. 4. In the illustration given, the arms 23 are apertured at their upper ends to receive the axle 22 and are secured to the axle by nuts 24 and washers 25 and 26. A brace 27 is also secured to the axle and extends over the top portion of the wheel so as to add rigidity to the structure. The brace 27 may be welded directly to the support arms 23 or otherwise rigidly connected to the support arms. The arms 23 and the brace 27 move together in the operation of the vehicle and are preferably rigidly connected. If desired, the arms 23 and the brace 27 may be formed in one piece.

Figure 2:
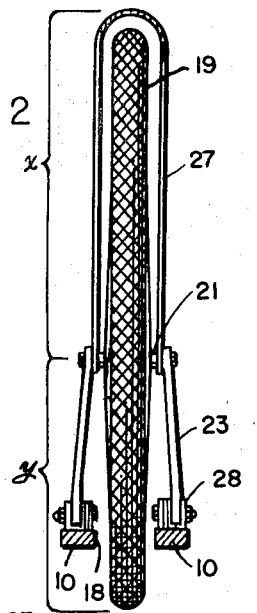

In the practice of my invention, the support arms 23 are pivotally connected at their lower ends to the footboard 10 and on each side of the longitudinal slot 18, as shown best in FIG. 2. In the illustration given best in FIG. 4, a flanged bracket 28 is secured to the board 10 by bolts 29, and a pivot bolt 30 extends between the ears of the bracket 28 and through a bronze, oil-impregnated bearing 31, as shown best on the left-hand side of FIG. 4. It will be understood that any suitable means for pivotally supporting the lower ends of the support arms upon the rear portion of the footboard 10 may be employed.

Figure 3:
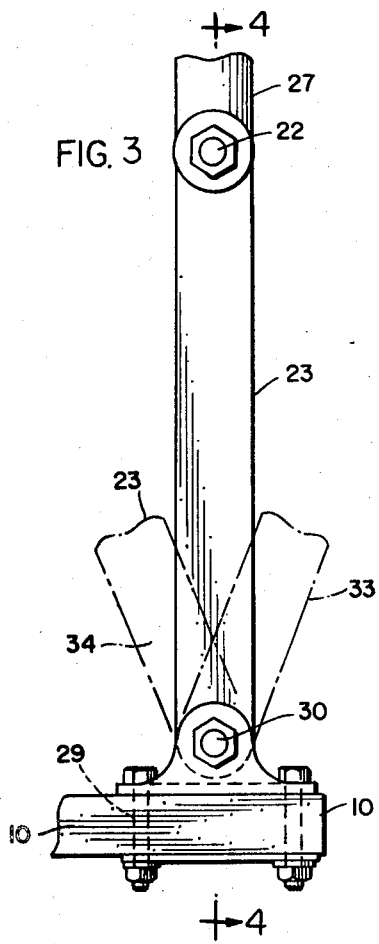

In the operation of the device, the rider stands upon the footboard 10 holding the handles 14 on steering shaft 13 and, after pushing the vehicle forwardly, shifts his weight from front to back so as to exert a downward thrust upon the rear wheel 19 after the support arms have moved upwardly and forwardly beyond the position indicated by dotted lines 32 in FIG. 1. At this point, the footboard 10 has raised to elevate the support arms and to carry their top ends forwardly of center, and when the rider moves his weight to the rear of the board, a powerful thrust downwardly and rearwardly is made by the support arms 23. As the working stroke proceeds downwardly and the footboard 10 drops to its lower position, the rider moves his weight forwardly so that the momentum carries the support arms rearwardly and upwardly and again over center for the next power stroke. During the above operation, the wheel 19 moves forwardly and rearwardly, the wheel moving forward within the slot 18 during the rising of the support arms and then rearwardly during the power stroke, the pivoted support arms giving swinging-through positions which are indicated generally by dotted lines 33 and 34 in FIG. 3.

The swinging of the support arms enables the operator to develop a smooth rhythm in the operation and the jerkiness heretofore experienced is eliminated, while at the same time there is greater distance traveled per revolution and while requiring less vertical lifting of the footboard.

If desired, a fender (not shown) may be supported in front of the rear wheel 19 and such a fender may be supported by a strut mounted on the axle or by any other suitable means. It will be understood that guards and fenders of various types may be optionally employed.

While in the foregoing specification I have set out specific structure in considerable detail for the purpose of illustrating an embodiment of the invention, it will be understood that such details may be varied widely by those skilled in the art without departing from the spirit of my invention.

I claim:

1. In a rider-propelled vehicle, a footboard upon which the rider may stand and shift his weight forwardly and rearwardly in the propelling operation, a front support, a handle-equipped steering shaft mounted on said support and provided with a fork, a front wheel mounted in said fork, said footboard being provided at its rear with a longitudinal slot for receiving a rear wheel, support arms pivotally mounted upon said footboard at opposite sides of said slot, an axle mounted upon the tops of said support arms for swinging movement with the tops of said support arms relative to said footboard, a rear wheel within said longitudinal slot and provided with an offcenter bearing receiving said axle for the support of said wheel whereby said wheel rotates upon said axle as the axle moves longitudinally with the swinging of said support arms during travel of said vehicle.

2. The structure of claim 7 in which a bracket is rigidly mounted on each side of the slotted footboard and said support arms are pivotally mounted upon said bracket.

3. The structure of claim 1 in which a brace is fixed to said support arms and extends about said rear wheel for swinging movement with said support arms.

* * * * *

PO-1050
(5/69)

UNITED STATES PATENT OFFICE
CERTIFICATE OF CORRECTION

Patent No. 3,647,241   Dated March 7, 1972

Inventor(s) Phillip H. Huyssen

It is certified that error appears in the above-identified patent and that said Letters Patent are hereby corrected as shown below:

Claim 2, line 1, cancel "7" and insert -- 1 --.

Signed and sealed this 6th day of June 1972.

(SEAL)
Attest:

EDWARD M. FLETCHER, JR.
Attesting Officer

ROBERT GOTTSCHALK
Commissioner of Patents